(12) United States Patent
Sarigiannis et al.

(10) Patent No.: US 11,719,594 B2
(45) Date of Patent: Aug. 8, 2023

(54) SYSTEM AND METHOD FOR COMPRESSOR LEAK DETECTION

(71) Applicants: Catherine B. Sarigiannis, Grand Island, NY (US); Jeremiah J. Rauch, Clarence, NY (US); Mårten Källström, Sala (SE)

(72) Inventors: Catherine B. Sarigiannis, Grand Island, NY (US); Jeremiah J. Rauch, Clarence, NY (US); Mårten Källström, Sala (SE)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 17/517,141

(22) Filed: Nov. 2, 2021

(65) Prior Publication Data

US 2022/0326109 A1    Oct. 13, 2022

Related U.S. Application Data

(60) Provisional application No. 63/173,687, filed on Apr. 12, 2021.

(51) Int. Cl.
*G01M 3/26* (2006.01)
*F04D 27/00* (2006.01)

(52) U.S. Cl.
CPC ............ *G01M 3/26* (2013.01); *F04D 27/001* (2013.01)

(58) Field of Classification Search
None
See application file for complete search history.

(56) References Cited

U.S. PATENT DOCUMENTS

| | | | | |
|---|---|---|---|---|
| 3,396,299 | A * | 8/1968 | Yanaka | H01J 37/141 335/212 |
| 6,352,001 | B1 * | 3/2002 | Wickert | G01F 25/10 73/861.52 |
| 10,481,036 | B2 * | 11/2019 | Zhu | G01M 3/2807 |
| 2009/0274565 | A1 * | 11/2009 | White | F04D 27/0215 415/17 |
| 2013/0167935 | A1 * | 7/2013 | Lawson | F16K 37/0091 137/154 |

FOREIGN PATENT DOCUMENTS

| | | | |
|---|---|---|---|
| CN | 104976518 A | * | 10/2015 |
| CN | 105319145 A | * | 2/2016 |
| CN | 110514257 A | * | 11/2019 |

* cited by examiner

*Primary Examiner* — Matthew G Marini
(74) *Attorney, Agent, or Firm* — Robert J. Hampsch

(57) ABSTRACT

A method for leak detection in a system including a compressor. A first pressure differential is determined in the system via a first pressure differential indicator (PDI). The first pressure differential is converted into a first flow measurement. A second flow measurement is determined downstream of the compressor using a second PDI. The first flow measurement and the second flow measurement are compared to determine whether a leak exists between the first PDI and the second PDI.

18 Claims, 5 Drawing Sheets

SYSTEM AND METHOD FOR COMPRESSOR LEAK DETECTION

CROSS REFERENCE TO RELATED APPLICATIONS

This application is based on and claims priority under 35 U.S.C. § 119(e) to a U.S. Provisional Patent Application filed on Apr. 12, 2021 in the United States Patent and Trademark Office and assigned Ser. No. 63/173,687, the contents of which are incorporated herein by reference.

TECHNICAL FIELD

The present disclosure relates generally to systems that include a compressor, and more particularly, to a method for detecting a leak in a compressor system.

BACKGROUND

Compressor systems are typically outfitted with a device for pressure differential measurement disposed in a process flow path. This device for pressure differential measurement is generally used for surge control purposes in the compressor system. Such compressor systems may be utilized in any number of applications, including, for example, air separation systems.

FIG. 1 is a diagram illustrating a compressor system. The compressor system includes a restriction 102, which restricts gaseous flow within a pipe of the compressor system. The restriction 102 feeds into a compressor 104. The compressor 104 feeds into an aftercooler 106 and then a recirculation valve 108 for recirculation of the gas back to the restriction 102. A first pressure differential of the gas is measured at the restriction 102 via a first pressure differential indicator (PDI) 110.

Downstream of the compressor 104 is a compressor vent 112, after which process flow measurement is performed. A second pressure differential of the gas is measured at a flow element (FE) 114 via a second PDI 116. A temperature is measured at a temperature indicator (TI) 118 and a pressure is measured at a pressure indicator (PI) 120 at locations proximate to the FE 114. A flow indicator 122 uses the pressure differential at the second PDI 116, the temperature at the TI 118, and the pressure at the PI 120 to determine a process flow for the compressor system.

SUMMARY

According to one embodiment, a method for leak detection in a system having a compressor is provided. A first pressure differential is determined in the system via a first PDI. The first pressure differential is converted to a first flow measurement. A second flow measurement is determined downstream of the compressor using a second PDI. The first flow measurement and the second flow measurement are compared to determine whether a leak exists between the first PDI and the second PDI in the system.

According to another embodiment, a compressor system is provided. The compressor system includes a compressor. The compressor system also includes a first PDI configured for determining a first pressure differential in the compressor system. The system also includes a second PDI downstream of the compressor and configured for determining a second pressure differential. The system further includes a controller configured to convert the first pressure differential into a first flow measurement and convert the second pressure differential into a second flow measurement. The controller is also configured to compare the first flow measurement and the second flow measurement to determine whether a leak exists between the first PDI and the second PDI in the compressor system.

BRIEF DESCRIPTION OF THE DRAWINGS

The above and other aspects, features, and advantages of certain embodiments of the present disclosure will be more apparent from the following detailed description, when taken in conjunction with the accompanying drawings, in which.

DETAILED DESCRIPTION

Figure 1:
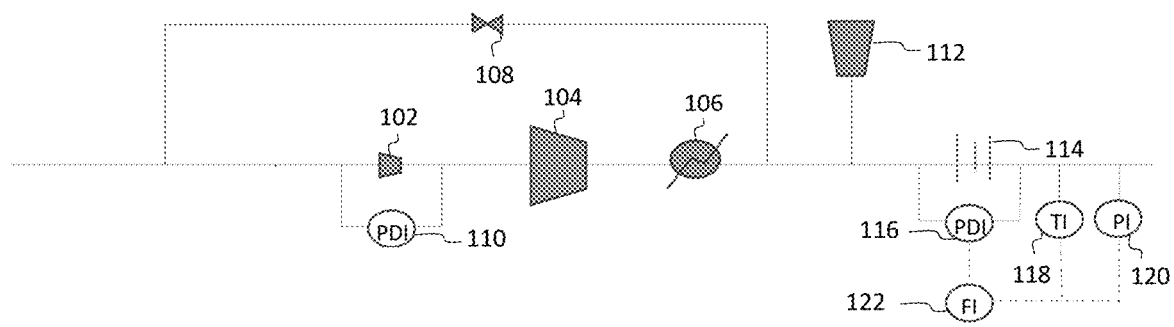
FIG. 1 is a diagram illustrating compressor system.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Figure 2:
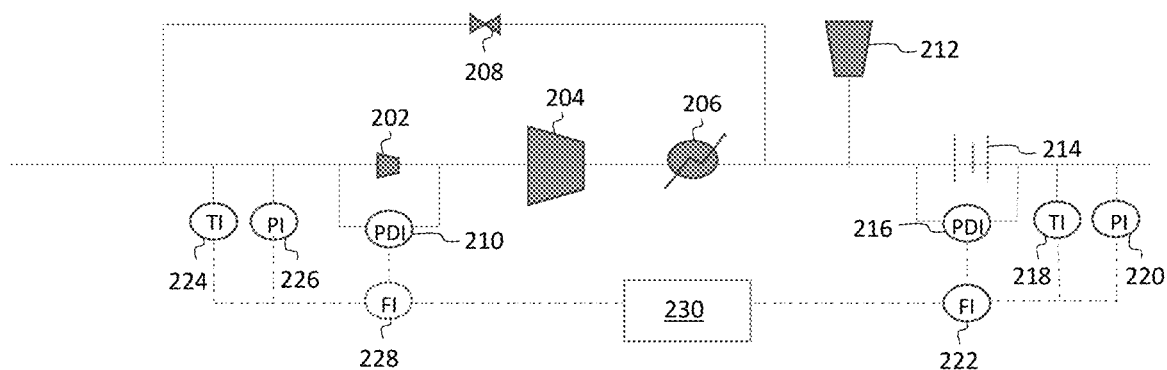
FIG. 2 is a diagram illustrating a compressor system, according to an embodiment of the disclosure.

FIG. 2 is a diagram illustrating a compressor system, according to an embodiment of the disclosure. The compressor system may be utilized in any number of applications, including, for example, air separation systems. Data of a pressure differential measurement taken within the compressor system can be converted into a compressor flow and calibrated to match a process flow measured downstream of the compressor at a starting point in historical data. At a later time, the compressor flow can be directly compared to the measured process flow to determine if there is a process leak from any source in the compressor system between the two devices where the measurements are taken. This method can also determine the magnitude and duration of a leak and can show the resulting change when the leak is repaired.

The compressor system includes a restriction 202, which may be embodied as a surge flow cone, a strainer, a cooler, or an FE. The restriction 202 feeds into a compressor 204, which may be of any type. The compressor 204 feeds into an aftercooler 206 and then a recirculation valve 208 for recirculation back to the restriction 202. A first pressure differential is measured at the restriction 202 via a first PDI 210, which is typically performed for surge control purposes.

A first TI 224 and a first PI 226 provide a temperature and a pressure, respectively, within the compressor system at a location proximate to the restriction 202. Using the three measurements within the compressor system, a flow indicator 228 determines a compressor flow based on Equation (1) below:

$$\text{Compressor Flow} = PDI^{0.5} * \text{Flow Constant} * \left(\frac{Pabs}{Tabs}\right)^{0.5} / (1 + hf) \quad (1)$$

Compressor Flow—flow at first PDI (for surge control) inside compressor system;

PDI—measured pressure differential inside compressor system;

Pabs—measured absolute pressure at first PDI location;

Tabs—measured absolute temperature at first PDI location;

Flow Constant—value set such that the calculated flow is equal to the process flow measured downstream of the compressor at a chosen starting point in historical data;

hf—humidity factor required for a main air compressor (MAC) to account for variation of water in the air at the restriction.

The hf is determined using Equation (2) below:

$$hf = 0.8 * \frac{1.013}{Pabs\,(\text{bar})} * \frac{RH}{100} * \\ (0.5661 * e^{(.018*T)} - 0.0000862 * T^2 - 0.009644 * T - 0.5604) \quad (2)$$

T—measured temperature at first PDI location (deg C)

RH—relative humidity

The units of the terms defined above can be variable and do not affect the accuracy of the flow comparison.

Downstream of the compressor 204 is a compressor vent 212, after which a process flow measurement is performed. A second pressure differential is measured at an FE 214 via a second PDI 216. The FE 214 may be embodied as an orifice, a ventury, or a pilot tube, for example. A temperature is measured at a second TI 218 and a pressure is measured at a second PI 220 at locations proximate to the flow element 214. A flow indicator 222 uses the pressure differential at the second PDI 216, the temperature at the second TI 218, and the pressure at the second PI 220 to determine a process flow for the system.

A controller 230 of the system compares the compressor flow within the compressor system to the process flow downstream of the compressor in order to determine a percent difference or error between the two flows. The percent difference or error is also equivalent to a leak percentage between the first PDI 210 and the second PDI 216. The controller 230 may also be used to determine both the controller flow and the process flow. Using the above-described method, bypass leaks are identified by their region and quantified, as set forth in the examples below.

Figure 3A:
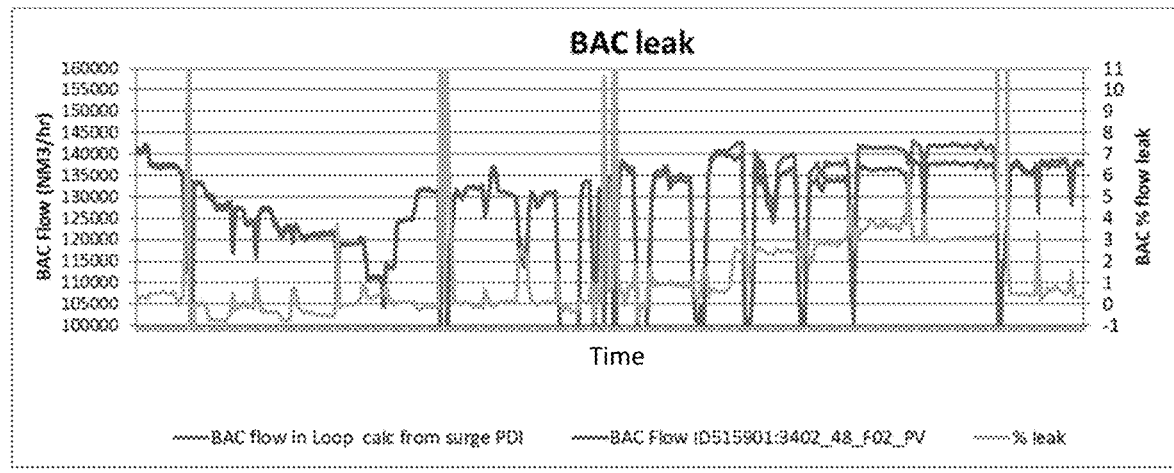
FIGS. 3A-3C are charts illustrating examples of leak detection, according to embodiments of the disclosure.

FIG. 3A is a chart showing a first example of leak detection, according to an embodiment of the disclosure. Specifically, FIG. 3A illustrates leak detection in a compressor system having a booster air compressor (BAC). The percent difference between a BAC flow ($mm^3$/hr) calculated using a surge PDI within the compressor system and a BAC flow ($mm^3$/hr) measured downstream of the compressor is initially calibrated to 0 using a flow constant. The percent difference between the flows is maintained within 1% for much of the operating history, which provides an indication of an accurate leak detection method with no increased leaks.

A leak is illustrated as a separation between BAC flow lines in FIG. 3A. Specifically, the leak is shown when the line of the BAC flow inside the compressor system is higher than the line of the BAC flow downstream of the compressor. A percent difference or error between the two BAC flow lines is also shown, which is the same as percent air leak in the BAC. The detection and correction of the leak results in a power savings for the system.

Figure 3B:
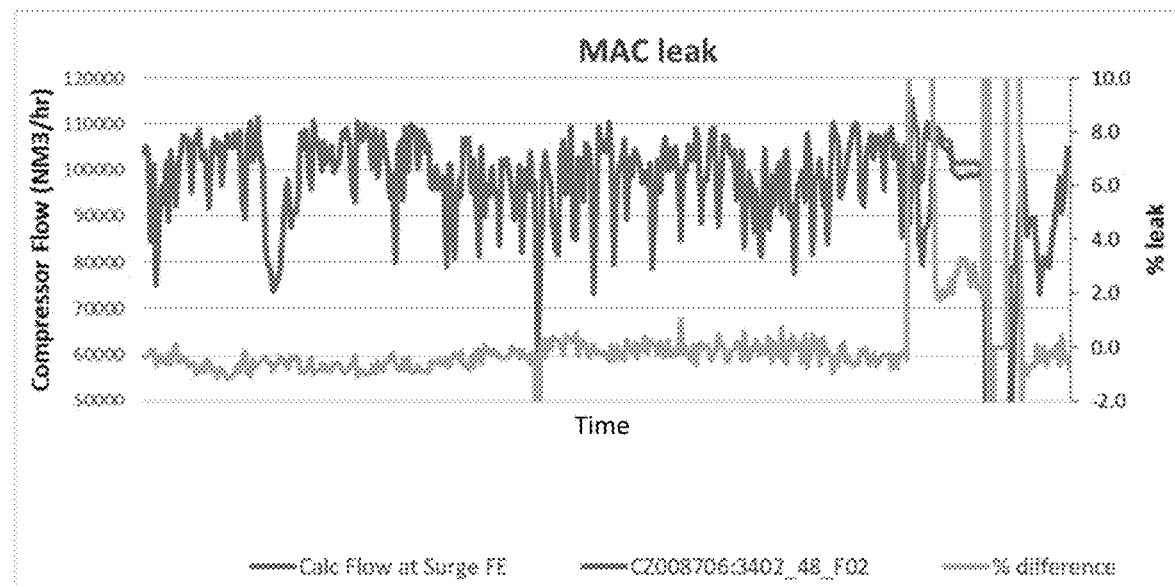

FIG. 3B is a chart showing a second example of leak detection, according to an embodiment of the disclosure. Specifically, FIG. 3B illustrates a leak detection in a compressor system having a MAC. The percent difference between a MAC flow ($mm^3$/hr) calculated using a surge PDI within the compressor system and a MAC flow ($mm^3$/hr) measured downstream of the compressor is initially calibrated to 0 using a flow constant. A vent valve leak is shown to be passing 3-4% of air until it was fixed toward the end of the chart.

Figure 3C:
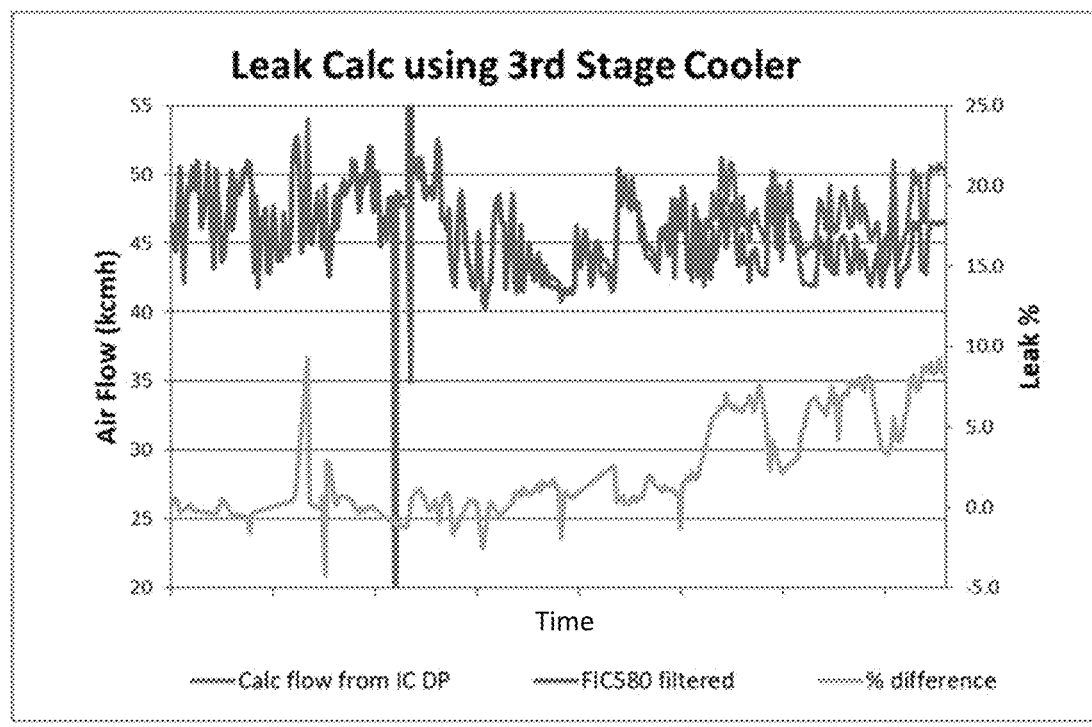

FIG. 3C is a chart showing a third example of leak detection, according to an embodiment of the disclosure. Specifically, FIG. 3C relates to a system that does not have a first PDI (e.g., existing surge PDI) installed inside the compressor system. Accordingly, PDI is measured across interstage coolers. Air flow measurements at interstage coolers provide less precise results due to that fact that they may artificially raise the PDI. However, if measurements at several interstage coolers indicate the same or a similar trend relating to a leak percentage, there is a higher probability that the method is accurately showing a leak. FIG. 3C shows a 5-9% leak which is due to a faulty MAC vent valve.

Figure 4:
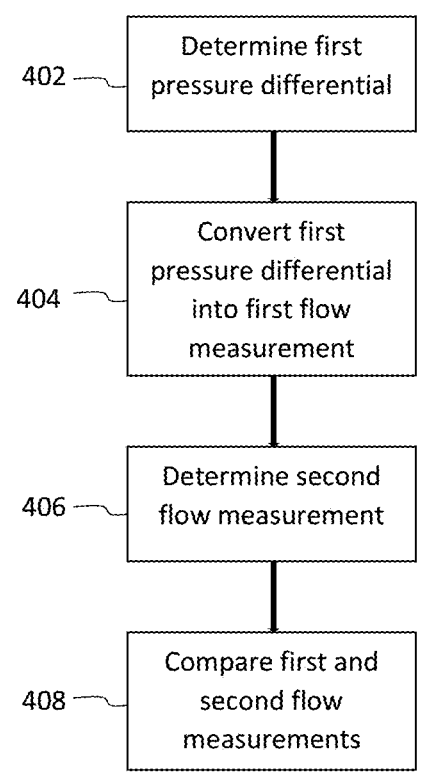
FIG. 4 is a flowchart illustrating a method for detecting a leak in a compressor system, according to an embodiment of the disclosure.

FIG. 4 is a flowchart illustrating a method for detecting a leak in a system having a compressor, according to an embodiment of the disclosure. Initially, at 402, a first pressure differential is determined in a compressor system via a first PDI. The compressor system includes at least a pipe restriction and the compressor. The first pressure differential is determined across the restriction, and the restriction may be embodied as at least one of a surge flow cone, a strainer, a cooler, and an FE. For example, taps may be installed across a pipe reduction or a pipe restriction in the compressor system. The compressor may be embodied as a BAC or a MAC.

At 404, the first pressure differential is converted into a first flow measurement. The first pressure differential is converted based on an absolute pressure at the first PDI, an absolute temperature at the first PDI, and a flow constant. The flow constant is previously set at a data start point such that a historical first flow measurement and a historical second flow measurement are equal. The first pressure differential is also converted based on a humidity factor, when the compressor is a MAC. The humidity factor accounts for a variation of water in air at the first PDI and is based on the absolute pressure at the first PDI, a temperature at the first PDI, and a relative humidity.

At 406, a second flow measurement is determined downstream of the compressor using a second PDI. The second flow measurement is based on a temperature at the second PDI and a pressure at the second PDI.

At 408, the first flow measurement and the second flow measurement are compared to determine whether a leak exists between the first PDI and the second PDI. A percent change or difference between the first flow measurement and the second flow measurement is determined, which indicates an air leak percentage between the first PDI and the second PDI. The comparison of the first flow measurement and the second flow measurement is repeated over time, as shown in FIGS. 3A-3C, to determine a magnitude and a duration of the leak.

Figure 5:
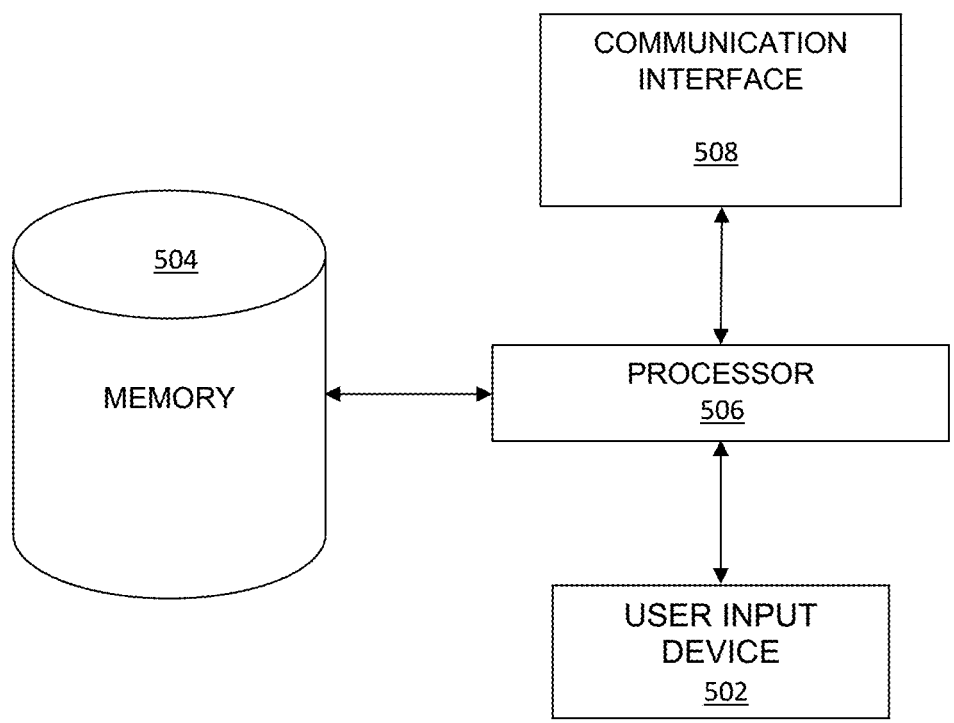
FIG. 5 is a block diagram illustrating a controller for controlling leak detection in a compressor system, according to an embodiment of the disclosure.

FIG. 5 is a block diagram illustrating a controller for controlling leak detection in a compressor system, according to an embodiment. The processor or controller may include at least one user input device 502 and a memory 504. The memory 504 may include instructions that allow a processor 506 to convert a pressure differential into a flow measurement and compute a percent change or difference between flow measurements.

The apparatus also includes the processor 506 for controlling the conversion of pressure differentials into flow measurements and computing percent changes between flow measurements. The processor may also control computation of a flow constant and a humidity factor. Additionally, the apparatus may include a communication interface 508 that receives signals, such as, for example, pressure differentials, temperatures, pressures, and flows, and transmits or outputs signals, such as, for example, percent changes between flow measurements.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for leak detection in a compressor system for an air separation unit, the method comprising:
   determining a first pressure differential across a restriction in the compressor system via a first pressure differential indicator (PDI), wherein the restriction is disposed upstream of the compressor and comprises at least one of a surge flow cone, a strainer, a cooler, and a flow element;
   converting the first pressure differential into a first flow measurement upstream of the compressor system;
   determining a second pressure differential across another restriction in the compressor system via a second pressure differential indicator (PDI), wherein the another restriction is disposed downstream of the compressor and comprises another flow element;
   comparing the first flow measurement and the second flow measurement to determine whether a leak exists between the first PDI and the second PDI in the compressor system.

2. The method of claim 1, wherein the first pressure differential is converted to the first flow measurement based on an absolute pressure at the first PDI, an absolute temperature at the first PDI, and a flow constant.

3. The method of claim 2, wherein the flow constant is set to a value that equates a historical first flow measurement to a historical second flow measurement at a data start point.

4. The method of claim 2, wherein the compressor system comprises a main air compressor or a booster air compressor.

5. The method of claim 4, wherein the compressor system comprises the main air compressor and the first pressure differential is converted to the first flow measurement based on a humidity factor that accounts for a variation of water in air at the first PDI.

6. The method of claim 5, wherein the humidity factor is determined based on an absolute pressure at the first PDI, a temperature at the first PDI, and a relative humidity.

7. The method of claim 1, wherein the second flow measurement is based on a temperature at the second PDI and a pressure at the second PDI.

8. The method of claim 1, wherein comparing the first flow measurement and the second flow measurement comprises determining a percent change between the first flow measurement and the second flow measurement, which indicates a leak percentage between the first PDI and the second PDI.

9. The method of claim 1, wherein the comparing of the first flow measurement and the second flow measurement is repeated over time to determine a magnitude and a duration of the leak.

10. A compressor system for an air separation unit comprising:
    a compressor;
    a restriction disposed upstream of the compressor, the restriction comprising at least one of a surge flow cone, a strainer, a cooler, and a flow element;
    another restriction disposed downstream of the compressor and comprising another flow element;
    a first pressure differential indicator (PDI) configured for determining a first pressure differential across the restriction in the compressor system;

a second PDI downstream of the compressor and configured for determining a second pressure differential across the another restriction; and a controller configured to:
convert the first pressure differential into a first flow measurement;
convert the second pressure differential into a second flow measurement;
compare the first flow measurement and the second flow measurement to
determine whether a leak exists between the first PDI and the second PDI in the compressor or the compressor system.

11. The compressor system of claim 10, wherein the controller converts the second pressure differential to the second flow measurement based on a temperature at the second PDI and a pressure at the second PDI.

12. The compressor system of claim 10, wherein the controller converts the first pressure differential to the first flow measurement based on an absolute pressure at the first PDI, an absolute temperature at the first PDI, and a flow constant.

13. The compressor system of claim 12, wherein the flow constant is set to a value that equates a historical first flow measurement to a historical second flow measurement at a data start point.

14. The compressor system of claim 12, wherein the compressor comprises a main air compressor or a booster air compressor.

15. The compressor system of claim 14, wherein the compressor comprises the main air compressor and the controller converts the first pressure differential to the first flow measurement based on a humidity factor that accounts for a variation of water in air at the first PDI.

16. The compressor system of claim 15, wherein the controller is further configured to determine the humidity factor based on an absolute pressure at the first PDI, a temperature at the first PDI, and a relative humidity.

17. The compressor system of claim 10, wherein, in comparing the first flow measurement and the second flow measurement, the controller is configured to determine a percent change between the first flow measurement and the second flow measurement, which indicates a leak percentage between the first PDI and the second PDI.

18. The compressor system of claim 10, wherein the controller is further configured to repeat the comparing of the first flow measurement and the second flow measurement over time to determine a magnitude and a duration of the leak.

* * * * *